US010443588B2

(12) United States Patent
Park et al.

(10) Patent No.: US 10,443,588 B2
(45) Date of Patent: Oct. 15, 2019

(54) MINI PUMP WITH INTEGRATED VALVE CORE TOOL

(71) Applicant: Bell Sports, Inc., Scotts Valley, CA (US)

(72) Inventors: Stephen C. Park, San Jose, CA (US); Mark J. Matson, Santa Cruz, CA (US)

(73) Assignee: Bell Sports, Inc., Scotts Valley, CA (US)

( * ) Notice: Subject to any disclaimer, the term of this patent is extended or adjusted under 35 U.S.C. 154(b) by 169 days.

(21) Appl. No.: 15/702,465

(22) Filed: Sep. 12, 2017

(65) Prior Publication Data

US 2019/0078561 A1    Mar. 14, 2019

(51) Int. Cl.
*F04B 33/00* (2006.01)
*F04B 19/04* (2006.01)
(Continued)

(52) U.S. Cl.
CPC .......... *F04B 19/04* (2013.01); *B25B 27/0071* (2013.01); *B25B 27/24* (2013.01);
(Continued)

(58) Field of Classification Search
CPC ........ F04B 39/14; F04B 33/00; F04B 33/005; F04B 33/02; F04B 19/04; F04B 19/22;
(Continued)

(56) References Cited

U.S. PATENT DOCUMENTS 1,548,755 A * 8/1925 Sattler .................... B60C 25/18
152/431
2,123,524 A   7/1938 Colley
(Continued)

FOREIGN PATENT DOCUMENTS

CN    105751536    7/2016
DE    102009045772    4/2011
(Continued)

OTHER PUBLICATIONS

Presta Valve Core Unscrewing With Mini Pump Hose Source: http://www.bikeradar.com/forums/viewtopic.php?t=12746214 Publication Date: Nov. 7, 2009 Date Accessed: Dec. 28, 2016.
(Continued)

*Primary Examiner* — Charles G Freay
*Assistant Examiner* — Thomas Fink
(74) *Attorney, Agent, or Firm* — Booth Udall Fuller, PLC (57) ABSTRACT

A mini pump comprising a linear hand pump assembly and a valve core tool is disclosed. The linear hand pump assembly is configured to operate along a longitudinal pump axis and comprises a first end and a second end opposite the first end. The valve core tool is releasably coupled to the first end and has a central tool axis and a cavity centered on, and running parallel to, the central tool axis. The cavity passes through at least one of a top surface and a bottom surface of the tool and is shaped to mate with a valve core such that, with respect to rotation about the tool axis, the valve core is rotationally fixed to the tool. The pump axis and the tool axis are collinear when the tool is coupled to the assembly. The valve core tool and the pump assembly may be threadedly coupled.

18 Claims, 6 Drawing Sheets

(51) Int. Cl.
  B60C 25/18 (2006.01)
  B25B 27/00 (2006.01)
  B25B 27/24 (2006.01)
  B25G 1/10 (2006.01)
  F04B 9/14 (2006.01)
  F04B 19/22 (2006.01)

(52) U.S. Cl.
  CPC .............. B25G 1/102 (2013.01); B60C 25/18 (2013.01); F04B 9/14 (2013.01); F04B 19/22 (2013.01); F04B 33/005 (2013.01)

(58) Field of Classification Search
  CPC ..... B25B 27/24; B25B 27/0071; B60C 25/18; Y10T 137/3584
  USPC ........................................ 137/565.12, 565.25
  See application file for complete search history.

(56) References Cited

U.S. PATENT DOCUMENTS

| | | | |
|---|---|---|---|
| 3,852,839 A | 12/1974 | Blessing | |
| 3,981,625 A * | 9/1976 | Wickenberg | F04B 33/00 417/63 |
| 4,489,855 A | 12/1984 | Boetger | |
| 5,035,440 A | 7/1991 | Chappell | |
| 5,690,016 A * | 11/1997 | Hwang | B62J 9/02 417/234 |
| 5,715,554 A * | 2/1998 | Downs | B25F 1/00 152/415 |
| 5,898,965 A * | 5/1999 | Chuang | F04B 33/005 157/1.3 |
| 6,152,165 A * | 11/2000 | Fukuda | B25B 13/48 137/223 |
| 6,832,413 B1 * | 12/2004 | Applewhite | B25G 1/102 16/430 |
| 8,726,476 B2 | 5/2014 | Renaker | |
| 9,194,385 B1 * | 11/2015 | Dooley | B60C 25/02 |
| 9,278,439 B1 * | 3/2016 | Krause | B25B 27/24 |
| D755,026 S * | 5/2016 | Kim | B25G 1/102 D8/21 |
| 9,616,719 B1 * | 4/2017 | Jensen | B60C 25/18 |
| 2003/0156950 A1 * | 8/2003 | Ostrowiecki | B62J 11/02 417/234 |
| 2007/0143978 A1 * | 6/2007 | Stewart | B25B 27/24 29/221.5 |
| 2009/0060766 A1 * | 3/2009 | Hawkins | F04B 33/005 417/545 |
| 2009/0104059 A1 | 4/2009 | Wang | |
| 2016/0272167 A1 | 9/2016 | Zalzalah | |
| 2017/0043462 A1 * | 2/2017 | Brebant | B25B 23/1425 |
| 2017/0292507 A1 * | 10/2017 | Staples | F04B 33/005 |
| 2018/0257205 A1 * | 9/2018 | Wood | B25B 27/0035 |
| 2018/0281754 A1 * | 10/2018 | Staples | B60S 5/043 |

FOREIGN PATENT DOCUMENTS

| | | |
|---|---|---|
| DE | 102011000795 | 8/2012 |
| GB | 1442347 | 7/1976 |
| WO | 2004/029455 | 4/2004 |
| WO | 2005115685 | 12/2005 |

OTHER PUBLICATIONS

Mini Mountain Pumps Axiom Cycling Gear Source: http://www.axiomgear.com/products/pumps/mini-mountain-pumps/ Publication Date: Sep. 19, 2015 Date Accessed: Dec. 28, 2016.

BlackburnMedia: "Blackburn Core Slim Mini Pump: Slime and wickedly powerful", YouTube, Aug. 23, 2017, https://www.youtube.com/watch?v=WCk1R2mYUA4.

* cited by examiner

MINI PUMP WITH INTEGRATED VALVE CORE TOOL

TECHNICAL FIELD

Aspects of this document relate generally to pumps having an integrated valve core tool.

BACKGROUND

Threaded Presta valves have become a favored type of valve for bicycle tires. Some Presta valves have permanent cores, while others have removable valve cores, allowing for the introduction of sealant to a tire. After a pump has been used to inflate a tire with a Presta valve, the pump head must be unthreaded. Occasionally, in the process of unthreading the pump head from the valve stem, the turning motion causes the valve core to become lose or even completely unthreaded, allowing the air to escape from the tire.

Tools exist to tighten a Presta valve core, but they are often small and easily misplaced. The accidental unthreading of a valve core is not commonplace, yet can be extremely aggravating when it does happen. Loose conventional valve core tools are easily misplaced between uses, and can be hard to find in a rider bag. Previous attempts at attaching a valve core tool to a pump or mini pump have made the occasional valve core tool use more convenient at the cost of hindering the more frequent use of the pump by making it bulky and unwieldy.

SUMMARY

According to one aspect, a mini pump may comprise a linear hand pump assembly configured to operate along a longitudinal pump axis and comprising a first end and a second end opposite the first end, the first and second ends centered on the pump axis, and a valve core tool releasably coupled to the first end, the valve core tool having a central tool axis and comprising a cavity centered on, and running parallel to, the tool axis, the cavity passing through a top surface and a bottom surface of the valve core tool and shaped to mate with a valve core inserted along the tool axis such that, with respect to rotation about the tool axis, the valve core is rotationally fixed to the valve core tool, wherein the pump axis and the tool axis are collinear when the valve core tool is releasably coupled to the first end.

Particular embodiments may have one or more of the following features. The cavity may be open at both the top surface and the bottom surface of the valve core tool, and may pass entirely through the valve core tool, along the tool axis. The cavity may be shaped to mate with the valve core when inserted through either the top surface or the bottom surface. The valve core tool may be threadedly coupled to the first end. The valve core tool may comprise an upper portion and a threaded male lower portion, the threaded male lower portion releasably coupled to a threaded female socket of the first end. A width of the upper portion of the valve core tool may be substantially equal to a width of the first end. The upper portion of the valve core tool may be knurled. An O-ring positioned on the valve core tool such that while the valve core tool is releasably coupled with the first end, the O-ring is between a portion of the first end and a portion of the valve core tool. The pump assembly may comprise a pump head coupled to the second end. The pump head may be coupled to the second end through a flexible hose, the flexible hose slidably coupled to the pump assembly centered on and parallel to the pump axis, the flexible hose passing through the second end. The valve core tool may be composed of aluminum. At least part of the valve core tool may be cylindrical.

According to an aspect, a mini pump may comprise a linear hand pump assembly configured to operate along a longitudinal pump axis and comprising a first end and a second end opposite the first end, the first and second ends centered on the pump axis, and a valve core tool releasably coupled to the first end, the valve core tool having a central tool axis and comprising a cavity positioned on the tool axis, the cavity passing through at least one of a top surface and a bottom surface of the valve core tool and shaped to mate with a valve core such that when the valve core tool is placed on the valve core, rotation of the valve core is fixed to rotation of the valve core tool, wherein the pump axis and the tool axis are collinear when the valve core tool is releasably coupled to the first end.

Particular embodiments may comprise one or more of the following features. The cavity may be shaped to mate with the valve core when inserted through either the top surface or the bottom surface. The valve core tool may comprise an upper portion and a threaded male lower portion, the threaded male lower portion releasably coupled to a threaded female socket of the first end. A width of the upper portion of the valve core tool may be substantially equal to a width of the first end. The upper portion of the valve core tool may be knurled. An O-ring positioned on the valve core tool such that while the valve core tool is releasably coupled with the first end, the O-ring is between a portion of the first end and a portion of the valve core tool. The pump assembly may comprise a pump head coupled to the second end. The pump head may be coupled to the second end through a flexible hose, the flexible hose slidably coupled to the pump assembly centered on and parallel to the pump axis, the flexible hose passing through the second end.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the invention. To the contrary, if the provisions of 35 U.S.C. § 112, ¶6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112, ¶6. Moreover, even if the provisions of 35 U.S.C. § 112, ¶6 are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Threaded Presta valves have become a favored type of valve for bicycle tires. Their narrow width allows for smaller holes in the wheel rim, increasing strength. Some Presta valves have permanent cores, while others have removable valve cores, allowing for the introduction of sealant to a tire. Pump heads must be threaded onto the valve stem to add air to a tire with a Presta valve. After a pump has been used, the pump head must be unthreaded. Occasionally, in the process of unthreading the pump head from the valve stem, the turning motion causes the valve core to become lose or even completely unthreaded, allowing the air to escape from the tire.

The accidental unthreading of a valve core is rare enough that core valve tools are usually not kept at the ready. However, when such an unthreading occurs, it is very frustrating to have to start filling an empty tire all over again. Loose conventional valve core tools are easily misplaced between uses, and can be hard to find in a rider bag. Previous attempts at attaching a valve core tool to a pump or mini pump have made the occasional use of the valve core tool more convenient, but at the cost of hindering the more frequent use of the pump made bulky and unwieldy by the addition.

The various embodiments of a mini pump (also commonly called a bicycle frame pump) with an integrated valve core tool contemplated herein are advantageous to previous pumps and valve core tools known in the art because the valve core tool is releasably coupled to the mini pump such that it does not interfere with pump operation while remaining readily available. Most instances where a valve core has become loose or unthreaded occur as a result of attaching and detaching a pump to the threaded valve. By integrating a valve core tool into a mini pump, it is easy to access to tighten any valve core loosened by use of the mini pump. By coupling the valve core tool to an end of the mini pump, the pump profile is not altered, and use is not inhibited.

The following discussion and claims is made with respect to threaded valves and valve cores. According to various embodiments, such valves may refer to Presta-type valves, or any other air valve known in the art that has a threaded valve core.

Figure 1:
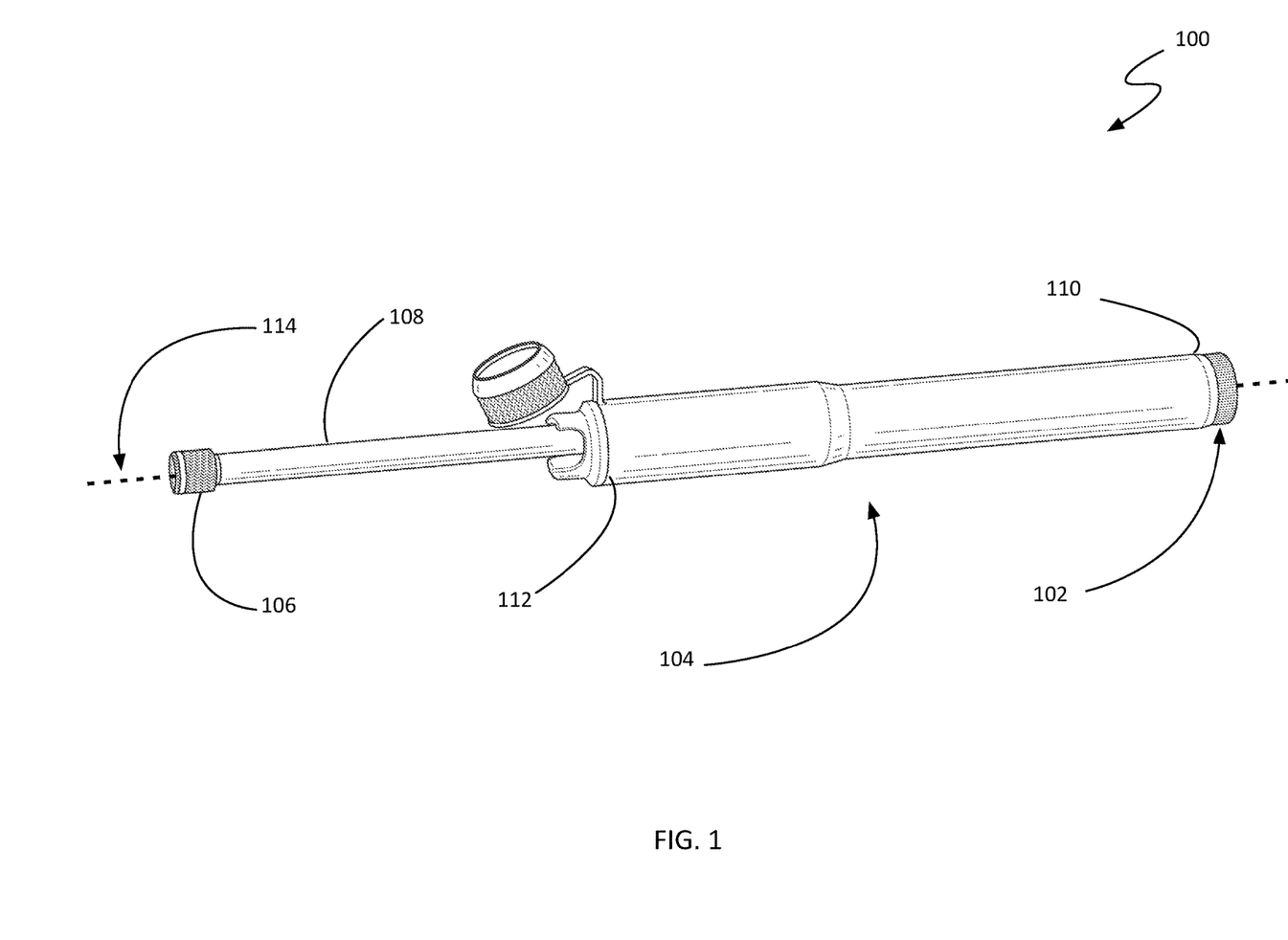
FIGS. 1 and 2 are perspective views of a mini pump with an integrated valve core tool, coupled and uncoupled.
Figure 2:
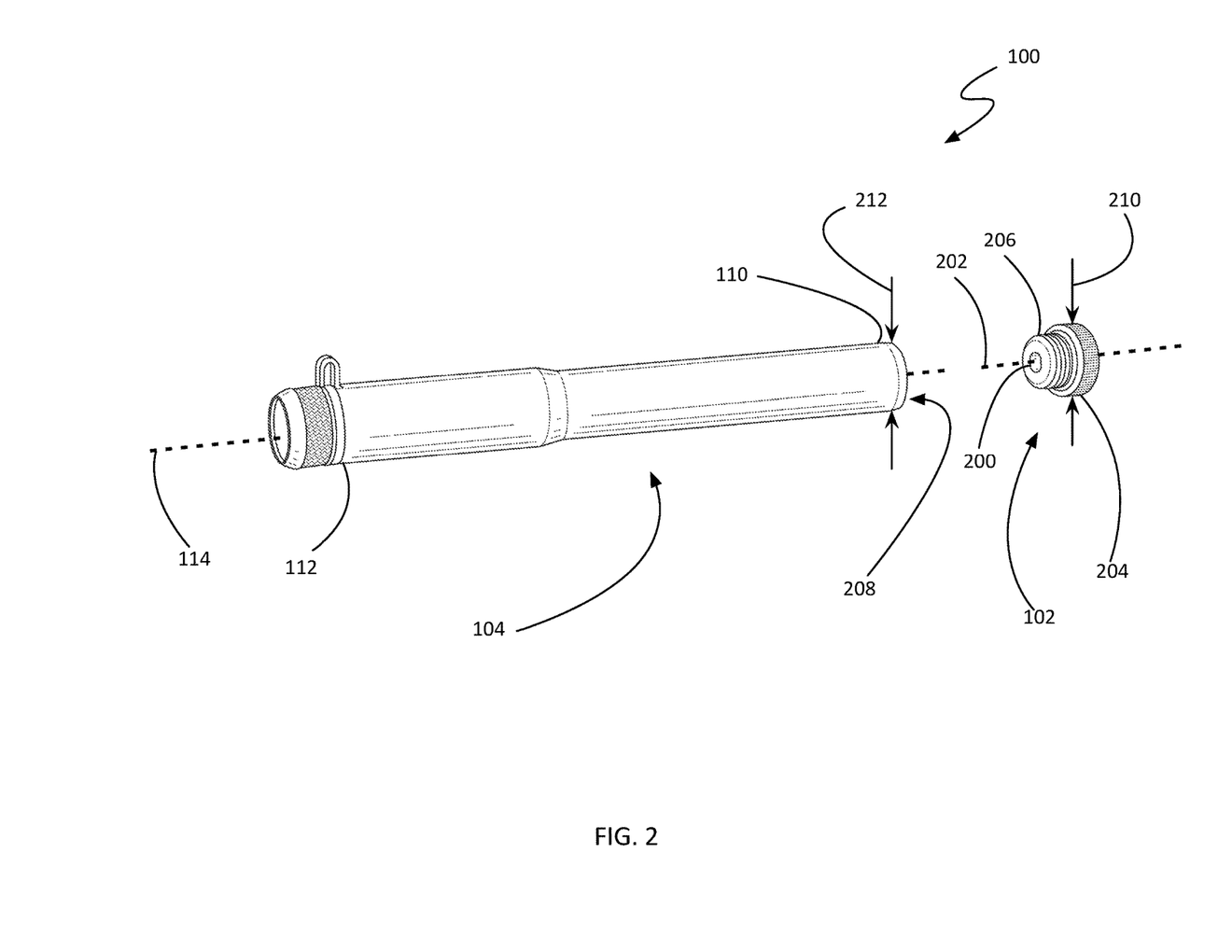

FIGS. 1 and 2 depict a non-limiting embodiment of a mini pump with an integrated valve core tool. FIGS. 1 and 2 show a mini pump 100 having a linear hand pump assembly 104 and a valve core tool 102 coupled to a first end 110 of the pump assembly 104. The linear hand pump assembly 104 is an air pump mechanism that is operated by the linear movement of a piston within a chamber, moving along a longitudinal pump axis 114. The pump assembly 104 draws air into the chamber through a one-way valve, and then pushes it out through a pump head 106 connected to a valve stem. According to various embodiments, the pump head 106 may be threaded, and may be rotatably coupled to the pump assembly 104, such that it may freely spin with respect to the rest of the assembly 104, facilitating the threading/unthreading of the pump head 106 onto a valve stem.

As shown, the pump assembly 104 may also comprise a flexible hose 108 connecting the pump head 106 with the assembly 104, passing through a second end 112 of the assembly 104. Pumping occurs when the first and second ends 110, 112 of the assembly are moved closer to and farther away from each other in repeated motions, with the assembly linearly elongating and shortening along the longitudinal pump axis 114 with each movement. Such mini pumps (or frame pumps) are well known in the biking industry. The use of a flexible hose 108 is advantageous, as it allows a user greater freedom in how the pump is used (e.g. position and angle with respect to the tire, etc.). The hose 108 may also act as a damper, preventing the vigorous movement of the pump being used from being communicated to the tire valve, potentially causing damage. FIG. 1 depicts the hose 108 and pump head 106 being extended away from the rest of the pump assembly 104, as it would be when the pump is in use. FIG. 2 depicts the same mini pump 100, with the hose 108 slid inside the body of the assembly for storage. In some embodiments, the hose 108 may slide along the longitudinal pump axis 114, inside the pump assembly 104, facilitating storage while remaining compact.

While FIGS. 1 and 2 depict one non-limiting example of a linear hand pump assembly 104, it should be readily clear to one skilled in the art that the linear hand pump assembly 104 could also be any other hand operated pumping mechanism known in the art. The pump assembly 104 may also be constructed of any materials known in the art of air pumps. Furthermore, various embodiments of the valve core tool 102 contemplated herein may be adapted for use with other, non-linear types of air pumps, such as a hinged pump assembly.

The valve core tool 102 is releasably coupled to the first end 110 of the linear hand pump assembly 104. In FIG. 1, the valve core tool 102 is coupled to the assembly 104, while in FIG. 2, the valve core tool 102 has been uncoupled from the pump assembly 104. As shown, the valve core tool 102 comprises an upper portion 204, a lower portion 206, and a cavity 200. According to various embodiments, the upper portion 204 of the tool 102 is what a user grips to couple or decouple the tool 102 from the pump assembly 104, while the lower portion 206 comprises the structure that actually couples with the assembly 104. In embodiments where the first end 110 of the assembly 104 goes inside the lower portion 206 (e.g. lower portion 206 has a female threaded segment, etc.), the lower portion 206 may also be gripped by the user to couple/decouple the tool 102 from the assembly 104.

The valve core tool 102 may be releasably coupled to the first end 110 through a variety of methods. The non-limiting embodiments depicted in FIGS. 1-6 make use of threading to releasably couple the tool 102 to the assembly 104. As shown, the lower portion 206 of the valve core tool 102 is male threaded, and sized to mate with a female threaded socket 208 inside the first end 110. In other embodiments, the lower portion 206 may comprise a female threaded portion inside of which a male threaded segment of the first end 110 may mate. Such male/female variations exist for many non-threaded methods of releasably coupling the tool 102 and the assembly 104, as well.

In other embodiments, the valve core tool 102 and the linear pump assembly 104 may be releasably coupled without using threading. For example, in some embodiments, the tool 102 and the assembly 104 may be releasably coupled using friction. As a specific example, in one embodiment, the first end 110 may comprise a projection covered in a rubber material sized to mate with the inside of the lower portion 206 of a tool 102 shaped to receive the projection. When joined, the friction between the material of the tool 102 and the rubber of the projection will keep the tool 102 secure until enough sustained force is applied to decouple it. In other embodiments, the core valve tool 102 may snap onto, or into, the first end 110 of the pump assembly 104. In still other embodiments, the tool 102 may be releasably coupled to the assembly 104 using one or more magnets. In yet other embodiments, the tool 102 and assembly 104 may be releasably coupled though any other means known in the art.

Figure 4:
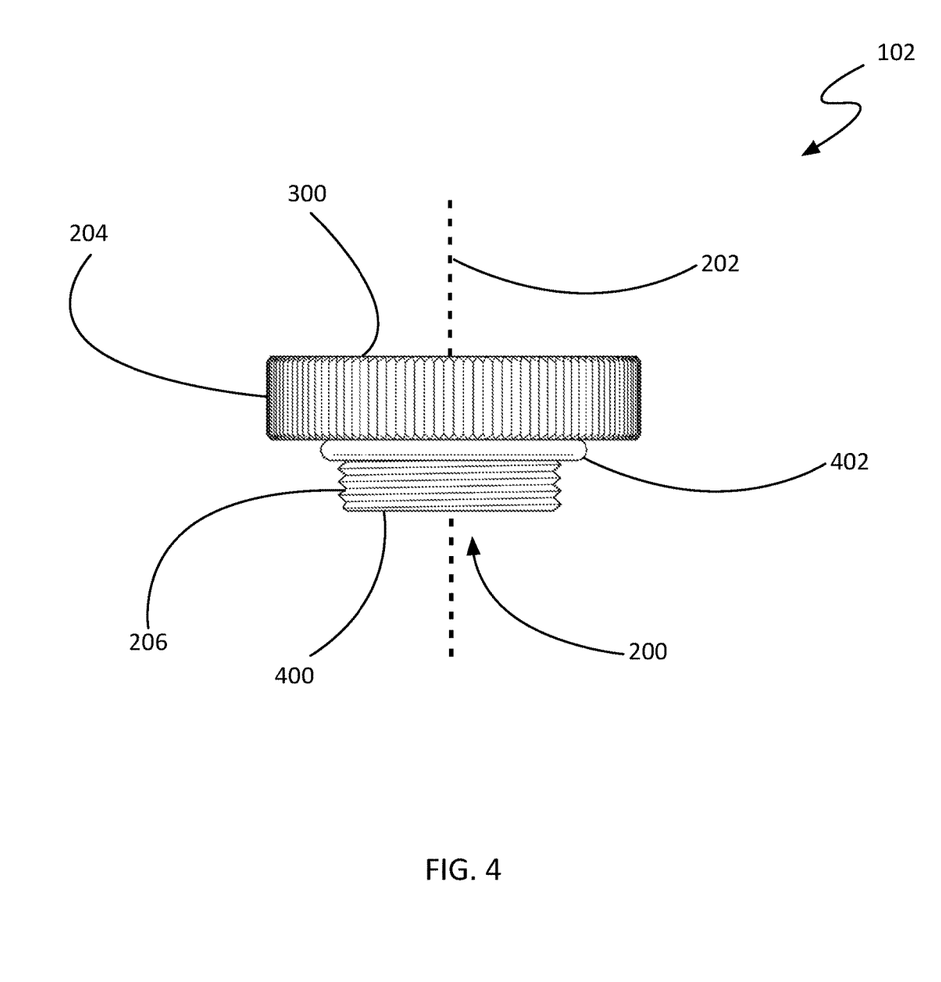
FIG. 4 is a side view of the valve core tool of FIG. 3.

The valve core tool 102 comprises a cavity 200 sized to fit a valve core, according to various embodiments. The cavity 200 is centered upon, and runs parallel to, a central tool axis 202, as shown in FIGS. 2 and 4. According to various embodiments, the central tool axis 202 and the longitudinal pump axis 114 are collinear when the valve core tool 102 is releasably coupled to the first end 110. In other words, the valve core tool 102 simply extends the pump assembly 104 by a small amount along its length, a minor modification unlikely to impede the operation of the pump.

According to various embodiments, the valve core tool 102, or at least the upper portion 204 of the valve core tool 102 has at least rough rotational symmetry about the tool axis 202. For example, in the non-limiting embodiments depicted in FIGS. 1-6, the upper portion 204 is cylindrical. In other embodiments, the upper portion 204 may have a cross section that is symmetric and roughly circular, such as a polyhedron (the higher the order, the better). This is advantageous, as the tool 102 is operated by rotation, and the greater the rotational symmetry, the easier it will be for a user to smoothly turn the tool 102 in their fingers.

The non-limiting example of a pump assembly 104 depicted in the figures is cylindrical, which is common among conventional mini pumps. However, it should be recognized by one skilled in the art that mini pumps, and pump assemblies, might be of any elongated shape. In some embodiments, the valve core tool 102, or at least the upper portion 204 of the valve core tool 102, may have the same shape or cross section as the pump assembly 104, to promote a sleek appearance. Furthermore, in some embodiments, the valve core tool 102, or at least the upper portion 204, may have a width 210 substantially equal with the width 212 of the first end, which may make the tool 102 flush with the assembly 104. In the context of the present description and the claims that follow, substantially equal means within 10%. In other embodiments, the tool 102 may vary from the assembly 104, to facilitate the coupling/uncoupling of the tool 102 from the first end 110.

In various embodiments, the first end 110 may have a female socket sized to receive the lower portion 206 of the valve core tool 102. In some embodiments, this socket may be the same size as the lower portion 206, while in others it may be larger, creating a space for storage, with the valve core tool 102 acting as a removable cap. Such storage may be used to store small items, such as a replacement valve core, incase one gets lost after accidental unthreading.

The valve core tool 102 may be constructed of any material known in the art. In some embodiments, the tool 102 may be composed of a metal, providing durability to protect threading from stripping damage due to over tightening a metal valve core. As a specific example, the tool 102 may be made of aluminum. In other embodiments, the tool 102 may be constructed of a plastic, such as a thermoplastic, reducing both cost and weight. In still other embodiments, the tool 102 may be constructed of any other material known in the art.

Figure 3:
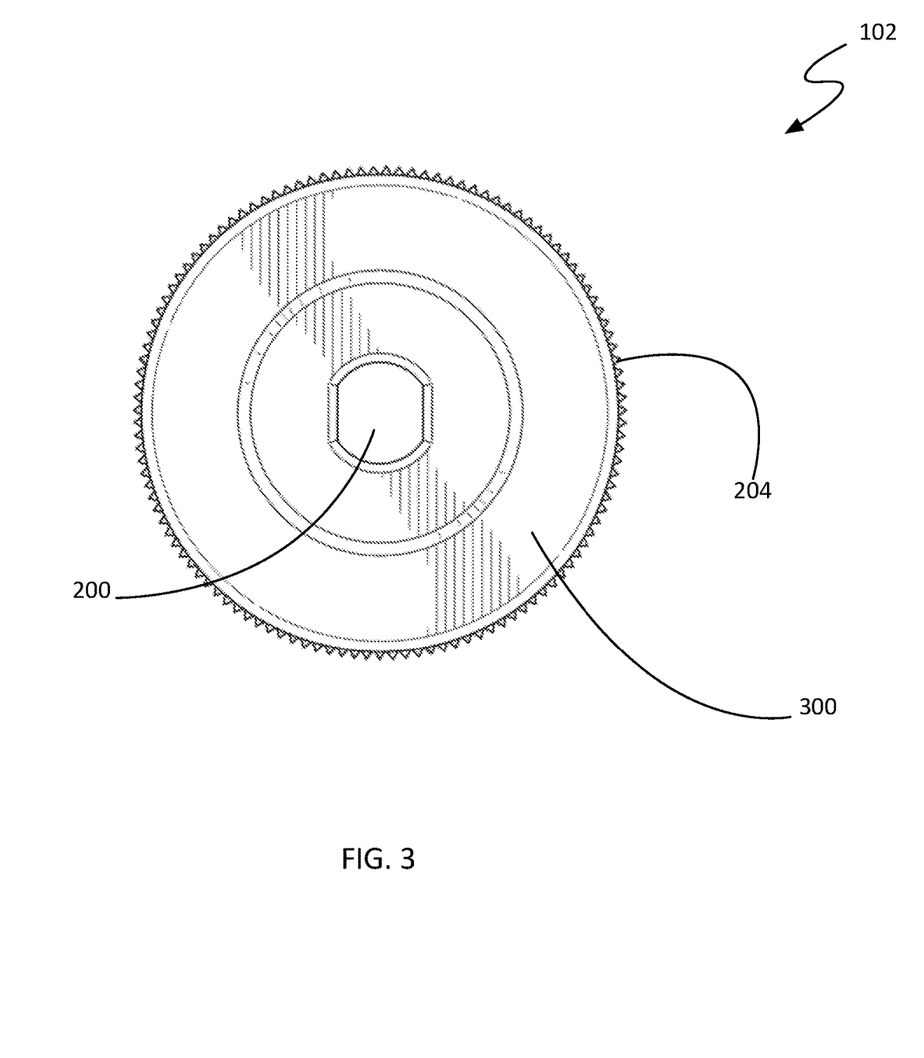
FIG. 3 is a top view of the valve core tool of FIG. 1.

FIGS. 3 and 4 depict top and side views of a non-limiting embodiment of a valve core tool 102. As shown, the tool 102 has an upper portion 204, a lower portion 206, a top surface 300, a bottom surface 400, and a cavity or slot 200. The cavity includes at least two sides shaped to mate with an inserted valve core, or more specifically mate with the cross-section of a valve core. As such, rotating the tool 102 about the tool axis 202 after a valve core has been inserted will cause the valve core to rotate, being rotationally fixed with respect to the tool 102. In particular embodiments, the cavity may be a reentrant opening in a side of the valve core tool to allow horizontal mating with the valve core through a side of the valve core tool. As shown in FIG. 3, the cavity 200 may be round with two flat sides, which is consistent with the shape of a Presta-type valve core. In other embodiments, the shape of the cavity 200 may be adapted for other types of valve cores.

In some embodiments, the cavity 200 extends into the tool 102 from either the top surface 300 or the bottom surface 400. In other embodiments, the cavity 200 may extend through both surfaces, such that the cavity 200 passes entirely through the tool 102, centered on and parallel to the central tool axis 202. This is advantageous, as it allows the valve core tool 102 to be used from either the top or the bottom, eliminating the need to find the correct side of the tool 102. See FIGS. 5 and 6.

In some embodiments, the valve core tool 102 may also comprise an O-ring 402. The O-ring 402 may sit in a groove in the valve core tool 102, and may be positioned such that while the valve core tool 102 is releasably coupled with the first end 110, the O-ring is between a portion of the first end 110 and a portion of the valve core tool 102. Sandwiching the O-ring between the tool 102 and the first end 110 allows for a tight fit, so that the tool 102 does not come unthreaded by vibration or movements experienced while being transported on a bicycle. The O-ring may be composed of rubber or any other elastic material known in the art.

In some embodiments, the part of the valve core tool 102 grasped by a user to couple or decouple it from the first end 110 may be configured to improve the user's grip. For example, in the non-limiting embodiment depicted in FIGS. 1-6, the upper portion 204 of the valve core tool 102 is knurled. In other embodiments, the upper portion may be given a matte finish, or roughened, or otherwise texturized to improve user grip. In still other embodiments, the upper portion may be covered by an elastomer material. In yet other embodiments, user grip on the valve core tool 102 may be improved using any methods, materials, or designs known in the art.

Figure 5A:
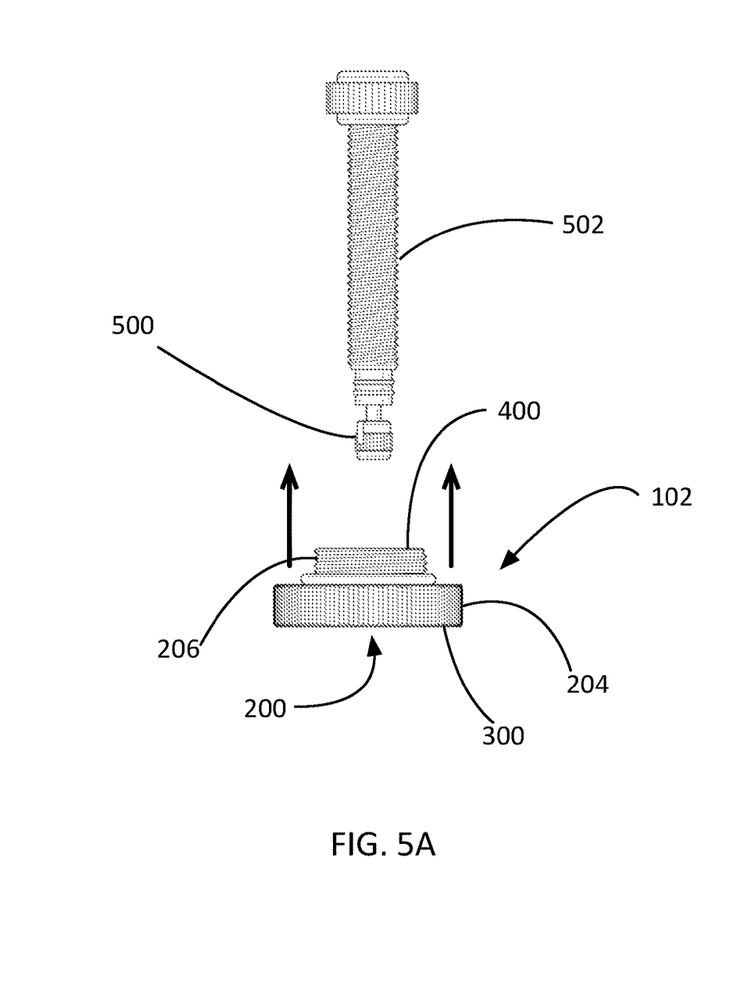
FIGS. 5A & 5B are side views of a valve core tool being applied to a valve core through the bottom surface.
Figure 5B:
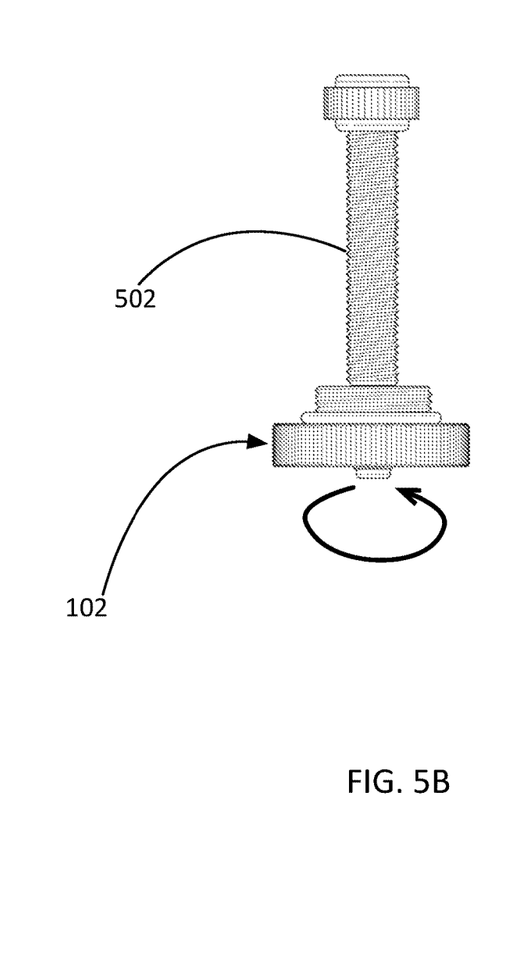
Figure 6A:
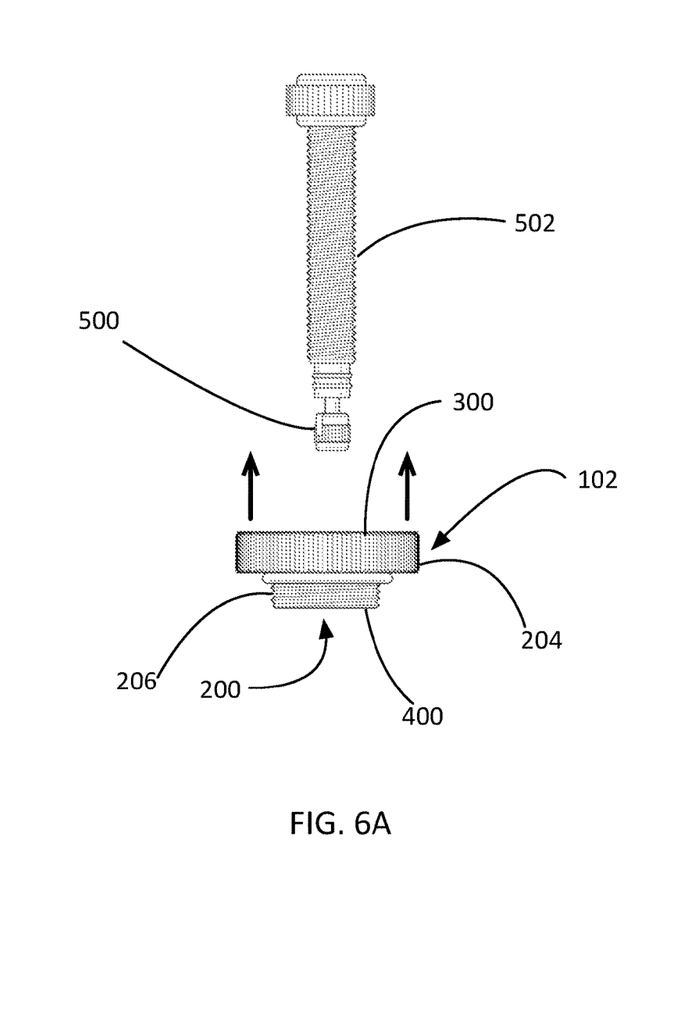
FIGS. 6A & B are side views of a valve core tool being applied to a valve core through the top surface.
Figure 6B:
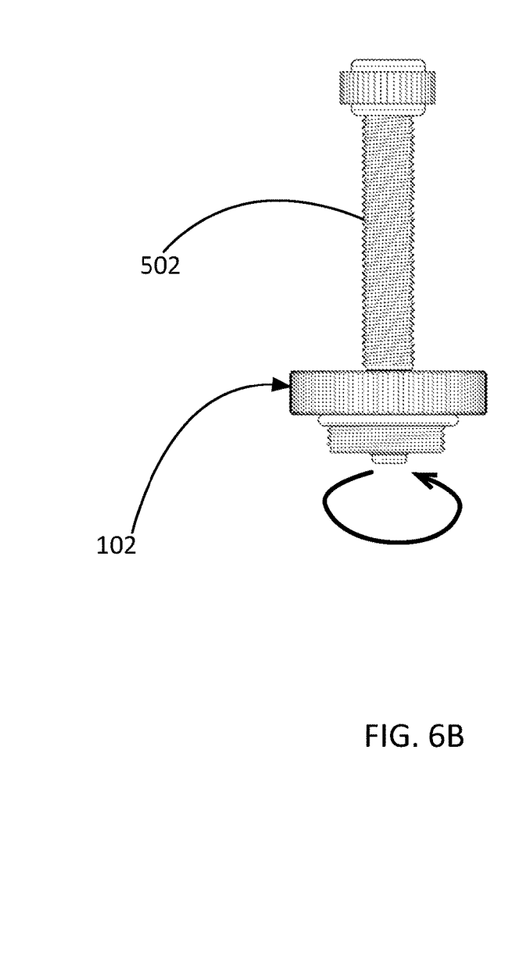

FIGS. 5AB and 6AB depict non-limiting examples of a valve core tool 102 being applied to a valve core 500 inside a valve stem 502. FIGS. 5A and 5B shows the tool 102 being applied from the bottom surface 400, while FIGS. 6A and 6B show the tool 102 being applied from the top surface 300. FIGS. 5A and 6A depict the tool 102 being applied to the valve core 500 by sliding the valve core 500 into the cavity 200. FIGS. 5B and 6B depict the valve core 500 being tightened into the valve stem 502 by rotating the valve core tool 102.

Where the above examples, embodiments and implementations reference examples, it should be understood by those of ordinary skill in the art that other mini pumps and pump assemblies and examples could be intermixed or substituted with those provided. In places where the description above refers to particular embodiments of mini pumps and pump assemblies with valve core tools, it should be readily apparent that a number of modifications may be made without departing from the spirit thereof and that these embodiments and implementations may be applied to other to air pump technologies as well. Accordingly, the disclosed subject matter is intended to embrace all such alterations, modifications and variations that fall within the spirit and scope of the disclosure and the knowledge of one of ordinary skill in the art.

What is claimed is:

1. A mini pump, comprising:
a linear hand pump assembly configured to operate along a longitudinal pump axis and comprising a first end and a second end opposite the first end, the first and second ends centered on the pump axis; and
a valve core tool releasably coupled to the first end, the valve core tool having a central tool axis and comprising a cavity centered on, and running parallel to, the tool axis, the cavity passing through a top surface and a bottom surface of the valve core tool and shaped to mate with a valve core inserted along the tool axis such that, with respect to rotation about the tool axis, the valve core is rotationally fixed to the valve core tool;
wherein the pump axis and the tool axis are collinear when the valve core tool is releasably coupled to the first end.

2. The mini pump of claim 1, wherein the cavity is open at both the top surface and the bottom surface of the valve core tool, and passes entirely through the valve core tool, along the tool axis.

3. The mini pump of claim 2, wherein the cavity is shaped to mate with the valve core when inserted through either the top surface or the bottom surface.

4. The mini pump of claim 1, wherein the valve core tool is threadedly coupled to the first end.

5. The mini pump of claim 4, wherein the valve core tool comprises an upper portion and a threaded male lower portion, the threaded male lower portion releasably coupled to a threaded female socket of the first end.

6. The mini pump of claim 5, wherein a width of the upper portion of the valve core tool is substantially equal to a width of the first end.

7. The mini pump of claim 5, wherein the upper portion of the valve core tool is knurled.

8. The mini pump of claim 4, further comprising an O-ring positioned on the valve core tool such that while the valve core tool is releasably coupled with the first end, the O-ring is between a portion of the first end and a portion of the valve core tool.

9. The mini pump of claim 1, wherein the pump assembly comprises a pump head coupled to the second end.

10. The mini pump of claim 9, wherein the pump head is coupled to the second end through a flexible hose, the flexible hose slidably coupled to the pump assembly centered on and parallel to the pump axis, the flexible hose passing through the second end.

11. The mini pump of claim 1, wherein the valve core tool is composed of aluminum.

12. The mini pump of claim 1, wherein at least part of the valve core tool is cylindrical.

13. A mini pump, comprising:
a linear hand pump assembly configured to operate along a longitudinal pump axis and comprising a first end and a second end opposite the first end, the first and second ends centered on the pump axis; and a valve core tool releasably coupled to the first end, the valve core tool having a central tool axis and comprising a cavity positioned on the tool axis, the cavity passing through at least one of a top surface and a bottom surface of the valve core tool and shaped to mate with a valve core such that when the valve core tool is placed on the valve core, rotation of the valve core is fixed to rotation of the valve core tool;

wherein the pump axis and the tool axis are collinear when the valve core tool is releasably coupled to the first end; and wherein the pump assembly comprises a pump head coupled to the second end through a flexible hose, the flexible hose slidably coupled to the pump assembly centered on and parallel to the pump axis, the flexible hose passing through the second end.

14. The mini pump of claim 13, wherein the cavity is shaped to mate with the valve core when inserted through either the top surface or the bottom surface.

15. The mini pump of claim 13, wherein the valve core tool comprises an upper portion and a threaded male lower portion, the threaded male lower portion releasably coupled to a threaded female socket of the first end.

16. The mini pump of claim 15, wherein a width of the upper portion of the valve core tool is substantially equal to a width of the first end.

17. The mini pump of claim 15, wherein the upper portion of the valve core tool is knurled.

18. The mini pump of claim 13, further comprising an O-ring positioned on the valve core tool such that while the valve core tool is releasably coupled with the first end, the O-ring is between a portion of the first end and a portion of the valve core tool.

* * * * *